US010482167B2

(12) United States Patent
Lupien et al.

(10) Patent No.: US 10,482,167 B2
(45) Date of Patent: Nov. 19, 2019

(54) CROWD-SOURCE AS A BACKUP TO ASYNCHRONOUS IDENTIFICATION OF A TYPE OF FORM AND RELEVANT FIELDS IN A CREDENTIAL-SEEKING WEB PAGE

(71) Applicant: McAfee, LLC, Santa Clara, CA (US)

(72) Inventors: Nicolas Lupien, Montreal (CA); Michael Lakhia, Montreal (CA); Hubert Gagnon-Lamonde, Montreal (CA)

(73) Assignee: McAfee, LLC, Santa Clara, CA (US)

( * ) Notice: Subject to any disclaimer, the term of this patent is extended or adjusted under 35 U.S.C. 154(b) by 201 days.

(21) Appl. No.: 14/864,448

(22) Filed: Sep. 24, 2015

(65) Prior Publication Data
US 2017/0091163 A1 Mar. 30, 2017

(51) Int. Cl.
G06F 17/20 (2006.01)
G06F 17/24 (2006.01)
G06F 16/951 (2019.01)
G06F 17/27 (2006.01)
H04L 29/08 (2006.01)

(52) U.S. Cl.
CPC .......... *G06F 17/241* (2013.01); *G06F 16/951* (2019.01); *G06F 17/243* (2013.01); *G06F 17/2725* (2013.01); *H04L 67/02* (2013.01); *H04L 67/2852* (2013.01)

(58) Field of Classification Search
CPC ............... G06F 17/2725; G06F 17/243; G06F 17/30864
See application file for complete search history.

(56) References Cited

U.S. PATENT DOCUMENTS

| 6,606,663 | B1* | 8/2003 | Liao ....................... G06Q 20/20 705/25 |
| 8,682,674 | B1 | 3/2014 | Komissarchik et al. |
| 8,869,022 | B1* | 10/2014 | Mills ..................... G06F 9/4446 715/230 |
| 9,218,364 | B1* | 12/2015 | Garrigues ......... G06F 17/30864 |
| 9,767,262 | B1* | 9/2017 | Canavor ............. G06F 21/6218 |

(Continued)

OTHER PUBLICATIONS

Yuen et al., A Survey of Crowdsourcing Systems, IEEE International Conference on Privacy, Security, Risk, and Trust, and IEEE International Conference on Social Computing (2011).*

(Continued)

*Primary Examiner* — Shahid K Khan
(74) *Attorney, Agent, or Firm* — Hanley Flight & Zimmerman LLC

(57) ABSTRACT

A technique allows a credential manager application on a client computer system to identify fields and forms on a web page. An analysis server may automatically crawl web pages and identify the fields and form, then push the information to the client computer system for use by the credential manager. If the credential manager discovers the information is not available, the credential manager may analyze the web form to discover the fields and form information, then provide the discovered information to the analysis server for providing to other client computers. The analysis server may use crowd-sourcing for asynchronous verification of field and form information discovered by the analysis server or provided by the client computer.

19 Claims, 6 Drawing Sheets

(56) References Cited

U.S. PATENT DOCUMENTS

| | | | |
|---|---|---|---|
| 2004/0205618 A1* | 10/2004 | Sini | G06F 17/30905 715/239 |
| 2008/0184100 A1 | 7/2008 | Selig | |
| 2008/0313529 A1 | 12/2008 | Gwozdz et al. | |
| 2009/0157557 A1* | 6/2009 | Hobson | G06Q 20/02 705/67 |
| 2010/0082662 A1* | 4/2010 | Taylor | G06F 17/30398 707/769 |
| 2012/0072253 A1* | 3/2012 | Ritter | G06Q 10/06 705/7.13 |
| 2012/0166464 A1 | 6/2012 | Honkola et al. | |
| 2012/0265573 A1* | 10/2012 | Van Pelt | G06Q 10/06311 705/7.14 |
| 2012/0265574 A1* | 10/2012 | Olding | G06Q 10/06 705/7.14 |
| 2013/0197954 A1* | 8/2013 | Yankelevich | G06Q 30/02 705/7.13 |
| 2013/0275803 A1* | 10/2013 | Kern | G06Q 10/063112 714/15 |
| 2014/0173405 A1 | 6/2014 | Ferrara et al. | |
| 2014/0317678 A1* | 10/2014 | Erickson | H04L 63/20 726/1 |
| 2014/0380141 A1 | 12/2014 | Craven et al. | |

OTHER PUBLICATIONS

International Searching Authority, "International Search Report," issued in connection with International Application No. PCT/US2016/053164, dated Dec. 27, 2016, 10 pages.

International Searching Authority, "Written Opinion of the International Searching Authority," issued in connection with International Application No. PCT/US2016/053164, dated Dec. 27, 2016, 7 pages.

* cited by examiner

CROWD-SOURCE AS A BACKUP TO ASYNCHRONOUS IDENTIFICATION OF A TYPE OF FORM AND RELEVANT FIELDS IN A CREDENTIAL-SEEKING WEB PAGE

TECHNICAL FIELD

Embodiments described herein generally relate to client and server networks and, more particularly, to determining a location of enrollment fields in and the type of form, in a credential seeking web page, by using crowd-sourced information.

BACKGROUND ART

Users typically maintain a number of web-based accounts to personalize a web experience. Examples of such web-based accounts include email accounts, online shopping accounts, online banking accounts, online brokerage accounts, and the like. Most accounts may be accessed in a web browser over a personal computer, mobile device, smart device or other personal device as users may find it convenient to access these accounts on their personal devices when they are away from a desk or home computer. Each web-based account (referred to herein as a web account) requires a user to provide a username, a password, and/or other user credentials in, for example, a web browser to provide access to the web account. Each web account may present, in a web page, a web form to the user during initial login and subsequent access to the web account. This web form is a structured document that includes "form fields" for entering user identifier or credential information, such as a user ID (a user identifier), a password, or the like.

Today, applications are available such as, for example, credential manager applications that that provide the ability to store user credentials and later be used for logging a user into the user's online accounts using web pages received over the internet. These applications log the user into the online account by entering user credentials in one or more fields in a web form that is received in the web page. However, over time, web forms in web pages may be changed and location of enrollment fields in previous web pages may not be located in similar locations in the new web pages. Therefore, user credentials that are stored on a user device cannot be used in new web pages. A way of determining a location of enrollment fields in a credential-seeking web page would be desirable.

DESCRIPTION OF EMBODIMENTS

Figure 1:
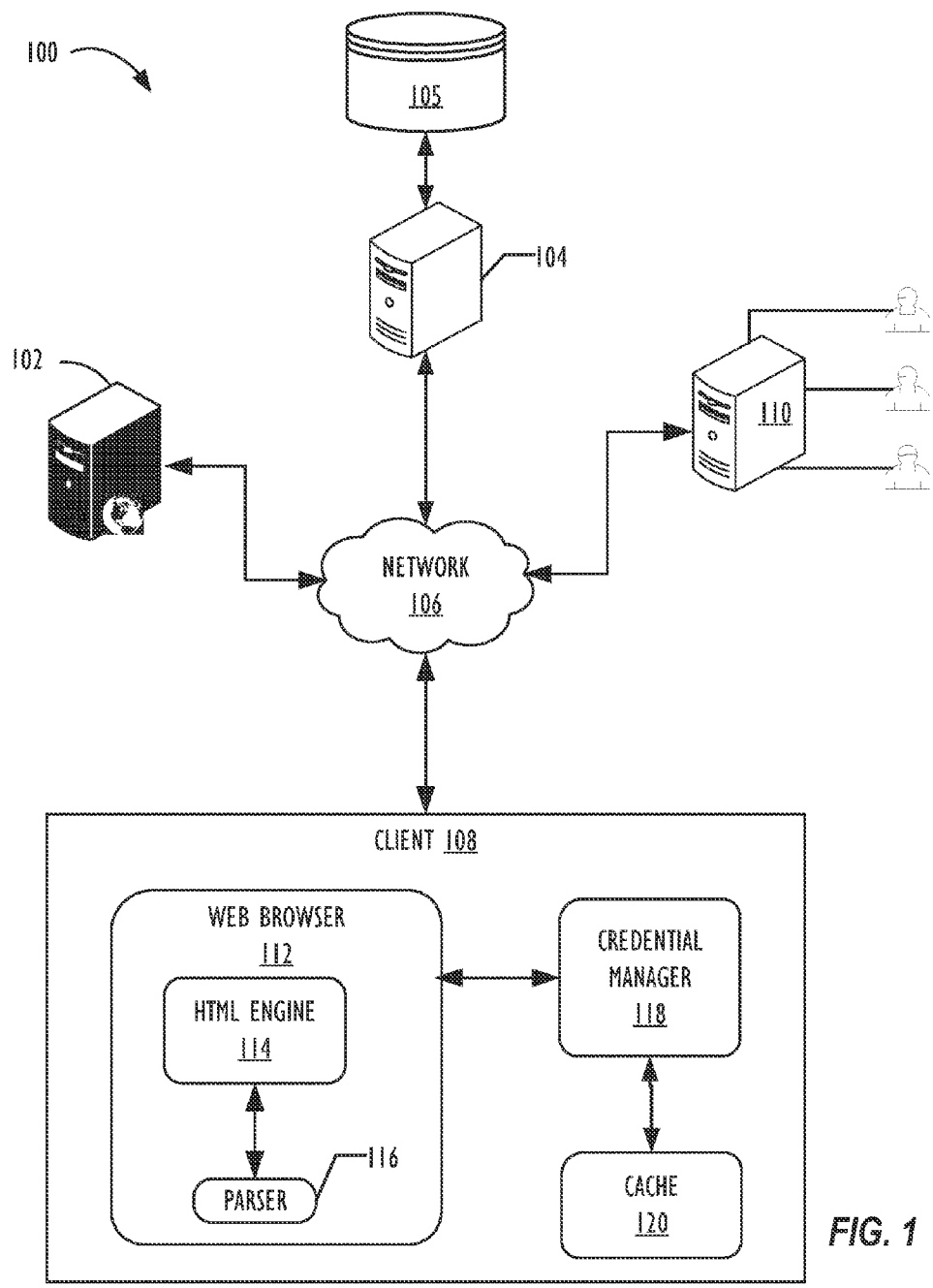
FIG. 1 is a diagram illustrating a system for identifying enrollments fields using crowd-sourced data according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "medium" can refer to a single physical medium or a plurality of media that together store the information described as being stored on the medium.

As used herein, the term "web crawler" can refer to an automated program, or script, that methodically scans or "crawls" through Internet pages to create an index of the data the web crawler is looking for. There are several uses for the program, perhaps the most popular being search engines using it to provide webs surfers with relevant websites. A web crawler can also be referred to as a web spider, a web robot, a bot, a crawler, and an automatic indexer.

As used herein, the term "headless browser" can refer to a web browser without a graphical user interface (GUI) that can access web pages over the internet but does not display them in the GUI on a client.

A technique allows a credential manager application on a client computer system to identify fields and forms on a web page. An analysis server may automatically crawl web pages and identify the fields and form, then push the information to the client computer system for use by the credential manager. If the credential manager discovers the information is not available, the credential manager may analyze the web form to discover the fields and form information, then provide the discovered information to the analysis server for providing to other client computers. The analysis server may use crowd-sourcing for asynchronous verification of field and form information discovered by the analysis server or provided by the client computer.

Referring to the figures, FIG. 1 illustrates a system 100 according to one embodiment. System 100 may include a web/content server 102, analysis server 104, network 106, client 108, and crowd-sourcing server 110. While a single element of each type is illustrated in FIG. 1 for clarity, any number of each of the elements may be used as desired.

Web server 102 is a server that communicates one or more web pages to client 108 via network 106. Web server 102 may transmit one or more HyperText Markup Language (HTML) web pages with web forms (also referred to as "login forms") having enrollment fields to a web browser 112 on client 108 in response to a Hypertext Transfer Protocol (HTTP) request, for example, a HTTP GET request from client 108. Web pages that are received from web server 102 may also include HTML text and Cascading Style Sheets (CSS) data. The web server 102 may also transmit web pages to analysis server 104 for use by analysis server 104 in determining the location of enrollment fields and other fields of web forms in web pages, as will be described below.

Analysis server 104 may also include a database or knowledge base 105, for storing information that includes information about fields and forms associated with web pages that has been discovered either by the analysis server 104 or by the client 108. Although referred to as a database or knowledge base, no specific format or type of data storage functionality is intended by the term, and any desired or convenient way of storing the field and form information may be used. Although as illustrated the database 105 is connected directly to the analysis server 104, embodiments may provide the database 105 as a remotely hosted database connected to a database server or other computer system that is then connected via the network 106 to the analysis server 104.

The network 106 may be a single network or a collection of interconnected networks, and different elements of the system 100 may be connected to different ones of the interconnected networks. The network 106 may include the Internet as well as private or other public networks of any type, using any type of network protocol for communication, including Internet Protocol (IP) network protocols.

The crowd-sourcing server 110 provides a crowd-sourcing functionality for use by the analysis server 104. Crowd-sourcing server 110 typically provides a way for small tasks to be performed under conditions defined by a crowd-sourcing client (in this case, the analysis server 104). Individuals typically may agree to perform the tasks for a small payment. These individuals are generally not employed by the entity controlling the crowd-sourcing server 110, but may be otherwise unconnected individuals who have enrolled with the crowd-sourcing service provider. The crowd-sourcing service is generally provided by a third-party service provider, although the entity controlling the analysis server may provide similar services using in-house facilities. One example of a crowd-sourcing service provider is Amazon Technologies, Inc., which provides the Amazon Mechanical Turk® crowd-sourcing service. (AMAZON MECHANICAL TURK is a registered trademark of Amazon Technologies, Inc.) Other crowd-sourcing service providers may be used as desired. The analysis server 104 typically has no information about the individuals who perform the requested tasks. As deployed in FIG. 1 and described in more detail below, simple questions with Yes-No answers are asked as part of the crowd-sourcing effort submitted to the crowd-sourcing server 110.

The analysis server 104 populates the database 105 with information regarding web pages and their respective forms and fields. The information stored in the database 105 may be sent from the client 108 and received by the analysis server 104 via the network 106 or may be generated by the analysis server 104 as a result of its web crawling functionality, described in more detail below.

The client 108 may be any type of programmable device, including any type of computer system, such as desktop, laptop, tablet, or other mobile device, and includes elements of typical computer systems, such as are described below in the description of FIGS. 5-6. The client 108 typically includes a web browser software 112, containing an HTML engine 114 and an HTML parser 116, which provide the functionality used for requesting, receiving, parsing, and displaying the web pages requested by the client 108. A credential manager application 118 provides secure management for credentials such as password, although other information such as credit card numbers may also be managed by the credential manager application 118. The operation of a credential manager application is generally outside the scope of the present invention and is described herein only for specific functionality of concern to the present disclosure. The client 108 may also maintain a cache 120 for caching information such as the field and form information used by the credential manager 118. The structure and implementation of the cache is not significant to the current disclosure, and any type of caching functionality may be used. The caching functionality 120 is typically non-volatile, such that the cached contents may survive a shutdown and restart of the client 108, but volatile cache storage techniques may be used as desired, such that a restart of the client 108 or the credential manager 118 may flush the cache 120.

Entries in the cache 120 may information about the web page, the web server 102, fields and form information, and any other desired information. In one embodiment, timestamps or other fields may be provided to allow any or all of the cache entries as invalid and not to be used. For example, the credential manager may mark entries associated with a web page as invalid upon discover that the web page has changed since the entry was created. In one embodiment, the analysis server 104 may push cache entries to the client 108 for insertion into the cache 120, and may also instruct the credential manager 118 to mark one or more cache entries as invalid.

Figure 2:
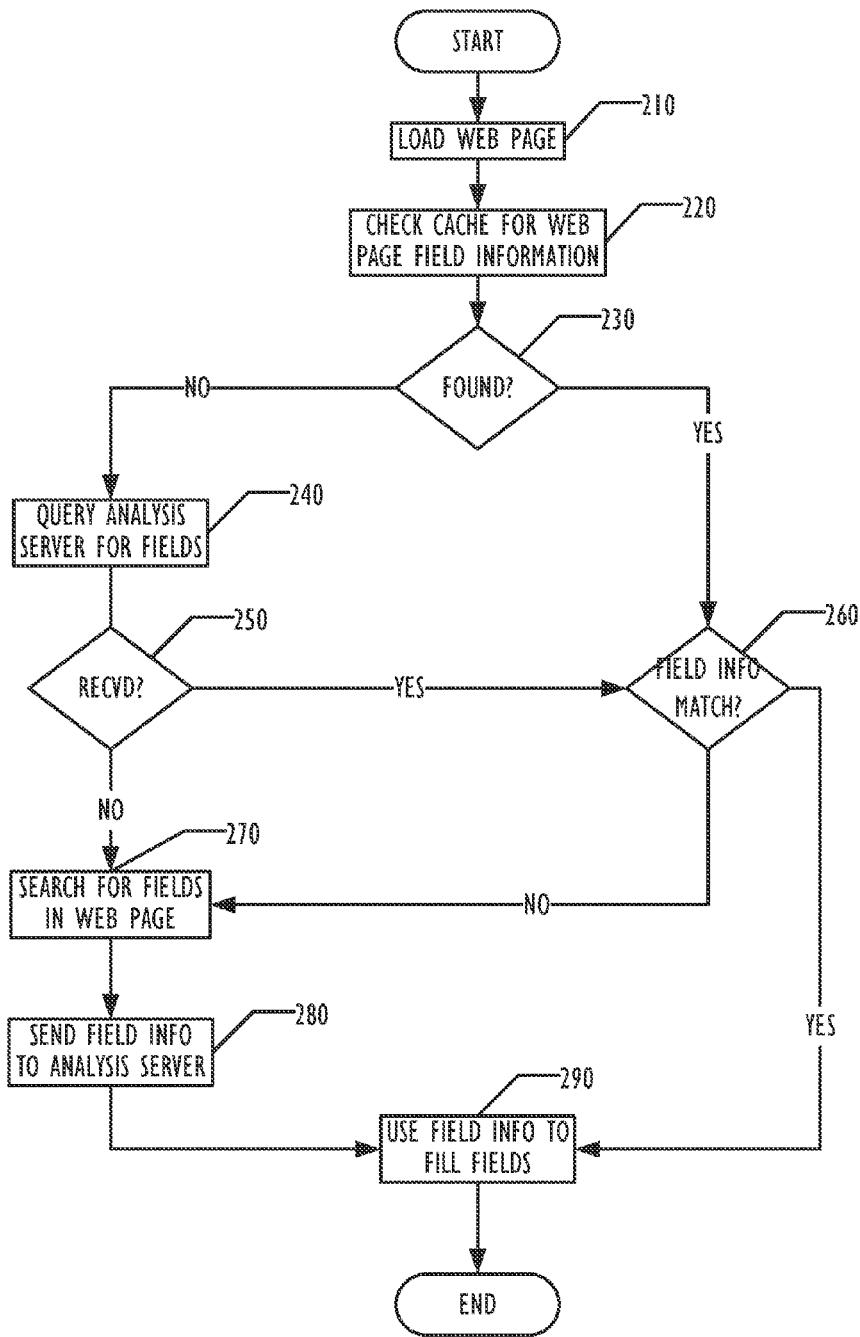
FIG. 2 is a flowchart illustrating a technique for identifying fields and filling fields in a web page by a credential manager application according to one embodiment.

FIG. 2 is a flowchart illustrating a technique for a credential manager application 118 to use field and form information obtained from the analysis server 104 for inserting credentials into a web form of a web page served by web server 102. In block 210, the client 108 loads the web page from the web server 102. The credential manager 118 now tries to determine where the appropriate fields (if any) are on the web page for submission as a web form.

In block 220, the credential manager 118 checks the cache 120 to see if there are entries for the current web page. If any cache 120 entries are found in block 230 that are not marked invalid, the credential manager may then determine in block 260 whether the field and form information in those entries matches the actual current web page. If so, then in block 290 the credential manager 118 may use those entries to insert credentials into one or more of the fields of the web form on the web page.

If no valid cache 120 entries are found, then in block 240 the credential manager 118 may query the analysis server 104 for any field and form information the analysis server 104 may hold related to the current web page, causing the analysis server 104 to search the database 105. If the client 108 fails to receive any field or form information in the current web page from the analysis server 104, as determined in block 250, in block 270 the credential manager 118 may analyze the web page to locate fields and forms in the current web page. The credential manager may then provide the discovered fields and forms to the analysis server 104 in block 280, who may choose to push that newly discovered field and form information out to other clients 108.

Finally, the credential manager may use the field and form information to insert credentials into the web page in block 290.

If the credential manager 118 receives field and form information for the current web page from the analysis server 104 as determined in block 250, then the field and form information is checked in block 260 as described above, to determine whether the field and form information from the analysis server 104 matches the current web page. In no match exists, then the credential manager may proceed as if no field and form information was received in block 270, searching for fields in the web page. Not illustrated in FIG. 2, the cache 120 may at any time be updated by the analysis server 104 for use in the illustrated procedure.

Figure 3:
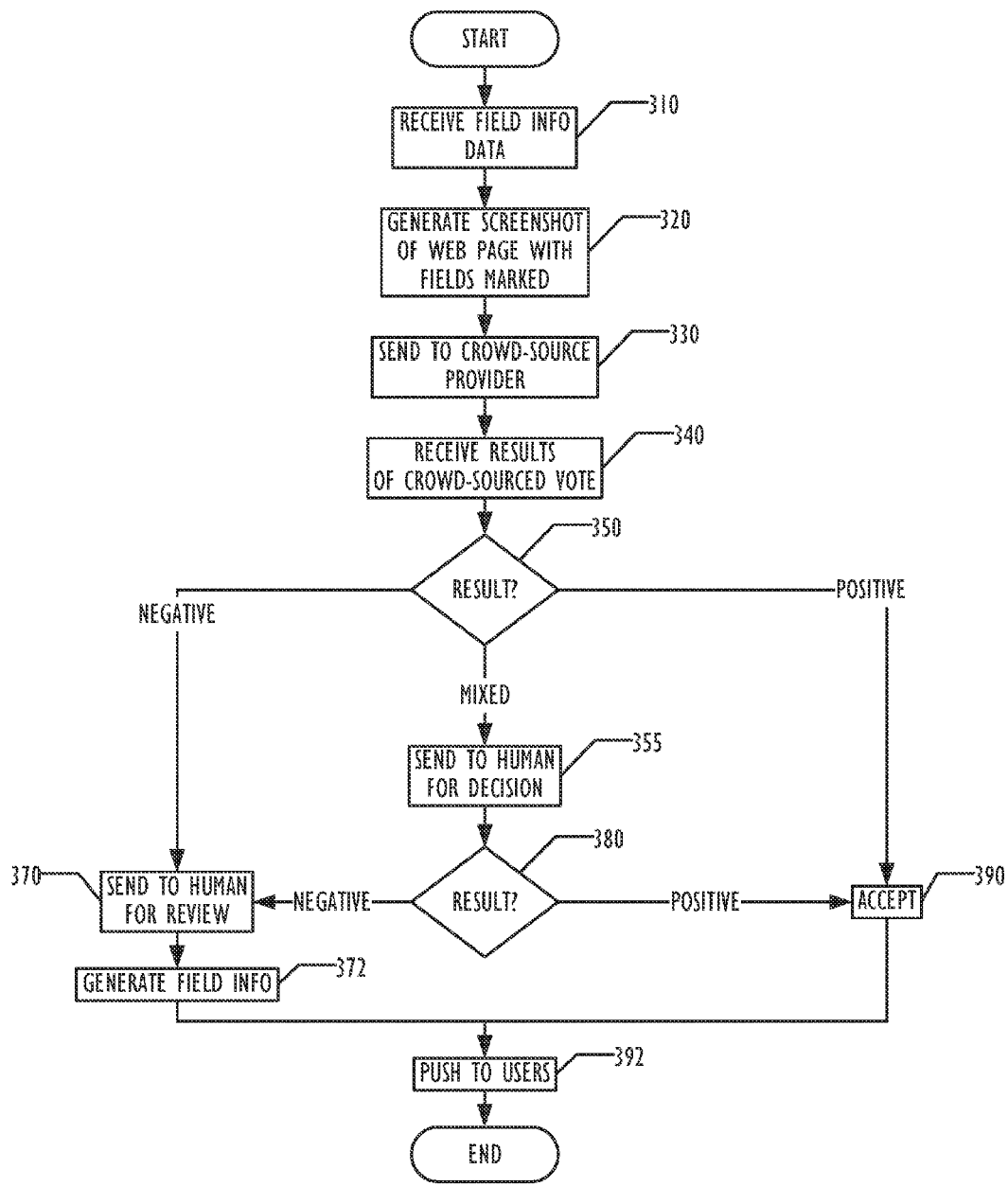
FIG. 3 is a flowchart illustrating a crowd-source assisted technique for identifying fields in a web page by a server according to one embodiment.

FIG. 3 is a flowchart illustrating an asynchronous technique for the analysis server 104 to discover fields and form information in web pages. In addition to receiving field and form information from clients 108 as described above, the analysis server 104 may include other techniques to automatically discover field and form information. In one embodiment, the analysis server employs a web crawler to crawl the web for web pages that may have forms for submitting credentials. Web crawling techniques are well known and are not further described herein. In one embodiment, the web crawler employed by the analysis server 104 may limit the crawling to web pages identified by a third party web page ranking resource as highly popular web pages. The analysis server may then prefill the cache 120 of clients 108 with information regarding such popular web pages, pushing the information via the network 106 to the clients 108. This crawling technique is asynchronous to the client 108's activity.

FIG. 3 illustrates a procedure for verifying that field and form information, whether received from client 108 or asynchronously discovered by web crawling. In block 310, the analysis server may receive the field and form information, either from the client 108 or the web crawler. In block 320, the analysis server may obtain the page and create a screenshot showing what a user would see on the screen if that web page were displayed by a browser. In one embodiment, this may be achieved by executing a headless browser to format the data that would be displayed, however without an actual display. The screen shot may then be annotated to mark the position of the fields corresponding to the field and form information, in some embodiments identifying the type of field, such as whether the field is a password field. Any type of visual marking may be used, such as surrounding the field with a border of a contrasting color.

In block 330, the annotated screenshot may be sent to the crowd-sourcing service provider via server 110, with a request for crowd-sourced validation of the fields. In one embodiment, the server 110 is requested to have 3 individuals review the annotated screenshot and respond with a simple yes/no answer to a question of whether the fields are correctly identified and marked. The question may be communicated in any desired way, including either separately from the screenshot or contained in the screenshot. Upon receiving results of the decisions by the crowd sourced individuals in block 340, in block 350 the analysis server analyses the results. In one embodiment, a positive result comprises all three of the crowd sourcers responding Yes to the question, saying that the fields and form information are correct as they are held by the analysis server 104 and sent to the crowd sourcer by the crowd sourcing server 110. Similarly a negative response comprises no more than one of the three crowd sourcers voting Yes, and a mixed response comprises two of the three voting Yes, but one of the three voting No. Using three crowd sourcers is illustrative and by way of example only, and any number may be used.

If the result of the vote in block 350 is positive, then in block 390 the field and form information may be accepted and pushed out to the caches 120 for use by the credential managers 118 on the clients 108.

If the result of the vote is negative, the screenshot's annotation of the web page is considered incorrect and the screenshot may be presented to another human being in block 370 to allow the human being to generate a new set of field and form information in block 372. The new and presumably corrected information may then be pushed to the user caches 120 in block 392.

If the result of the vote is mixed, the screenshot may be sent to another human being in block 355 for a final decision on the validity of the field and form annotations of the web page. If the human arbiter's decision is positive, as determined in block 380, then the procedure accepts the field and form information as valid and pushes the information to clients 108 in block 392. Similarly, if the human arbiter's decision is negative, the actions of block 370, 372, and 392 may be performed as described above.

In another embodiment, instead of or in addition to sending the annotated screenshots to a crowd-sourcing service provider at server 110, other techniques may be used. For example, computer vision techniques may be used to consider the annotated screenshots and use machine learning techniques directly in either a headless browser or a GUI browser, with or without marked fields to generate a decision on whether the field and form information is correct, given the decision a confidence level. A positive decision would then be a decision with a high confidence level that the field and form information is correct; a negative decision would be a decision with a high confidence level that the field and form information is incorrect, and a mixed decision would be a decision with a lower confidence level. In one embodiment a high confidence level that the field and form information is correct may be a confidence level that exceeds a first predetermined threshold, a high confidence level that the field is incorrect may be a confidence level that is lower than a second predetermined threshold, and a mixed decision may be a confidence level between the first and second predetermined thresholds. The processing of the computer-vision guided embodiment may then follow the procedure of blocks 350-392 of FIG. 3. Other embodiments may combine computer vision and crowd sourcing or use other automatic or semi-automatic techniques for verifying or validating the discovered field and form information.

By using these techniques, crowd-sourcing may be used as a backup to asynchronously discovering field and form information by the analysis server 104, providing a better user experience for the user of client 108, by detecting erroneous decisions about field and form information. These techniques are scalable, because any number of analysis servers may be used for performing the web crawling and backend analysis, and because any number of crowd sources may be employed by the crowd sourcing service provider without the need for the analysis server provider to hire dedicated staff to review and make decisions on field and form information at the level that would be needed to review very large numbers of web pages.

In one embodiment, if the web crawler of the analysis server 104 detects that a web page has changed since a previous crawl, the analysis server 104 may instruct the clients 108 to invalidate the corresponding entry in the cache 120. Similarly, if the analysis procedure illustrated in FIG. 3 determines that the field and form information is incorrect, the analysis server 104 may instruct the clients 108 to invalidate the corresponding entry in the cache 120 before pushing the new field and form information to the clients 108 for storing in the cache.

Figure 4:
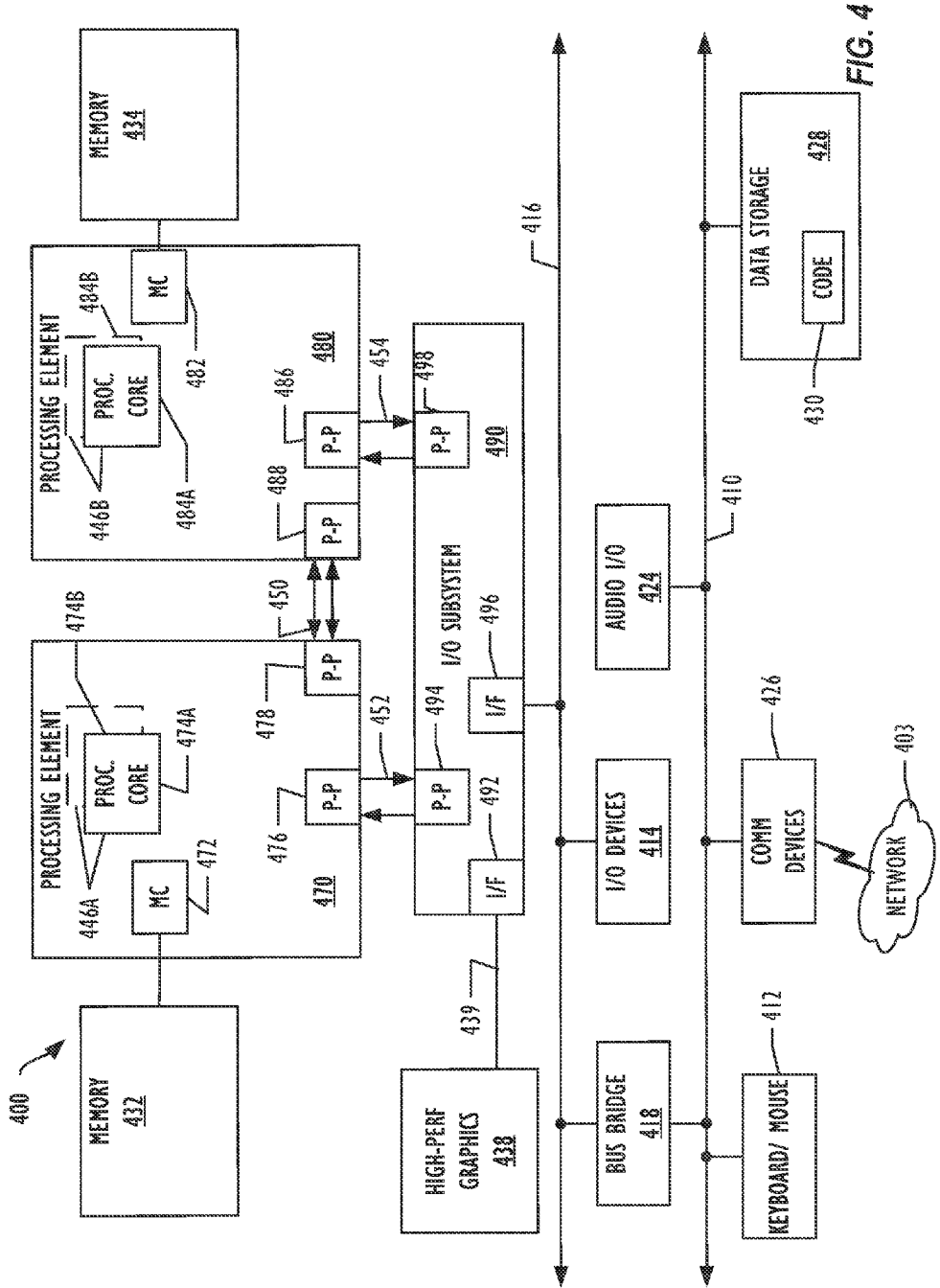
FIG. 4 is a diagram illustrating a computing device for use with techniques described herein according to one embodiment.

Referring now to FIG. 4, a block diagram illustrates a programmable device 400 that may be used as the analysis server 104 or the client 108 in accordance with one embodiment. The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute instruction code in a manner similar to that discussed above in connection with FIGS. 1-3. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., instructions) that are utilized by one or more components of the processing element, such as the cores 474a, 474b and 484a, 484b, respectively. For example, the shared cache may locally cache data stored in a memory 432, 434 for faster access by components of the processing elements 570, 580. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 410. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

Figure 5:
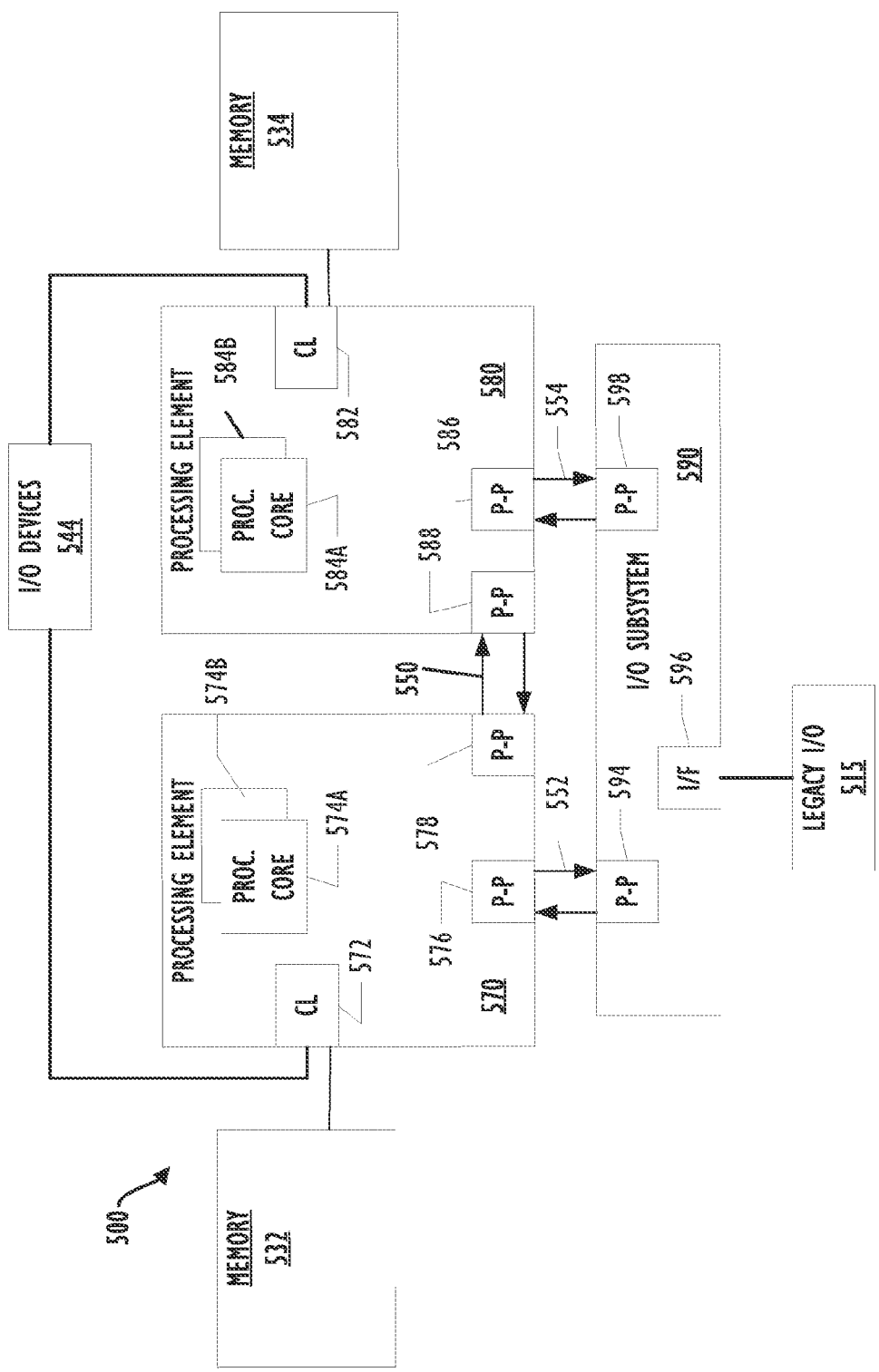
FIG. 5 is a block diagram illustrating a computing device for use with techniques described herein according to another embodiment.

Referring now to FIG. 5, a block diagram illustrates a programmable device 500 according to another embodiment. Certain aspects of FIG. 5 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the 572, 582 may include memory control logic (MC) such as that described above in connection with FIG. 5. In addition, CL 572, 582 may also include I/O control logic. FIG. 5 illustrates that not only may the memories 532, 534 be coupled to the 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively.

The programmable devices depicted in FIGS. 4 and 5 are schematic illustrations of embodiments of programmable devices that may be utilized to implement various embodiments discussed herein. Various components of the programmable devices depicted in FIGS. 4 and 5 may be combined in a system-on-a-chip (SoC) architecture.

Figure 6:
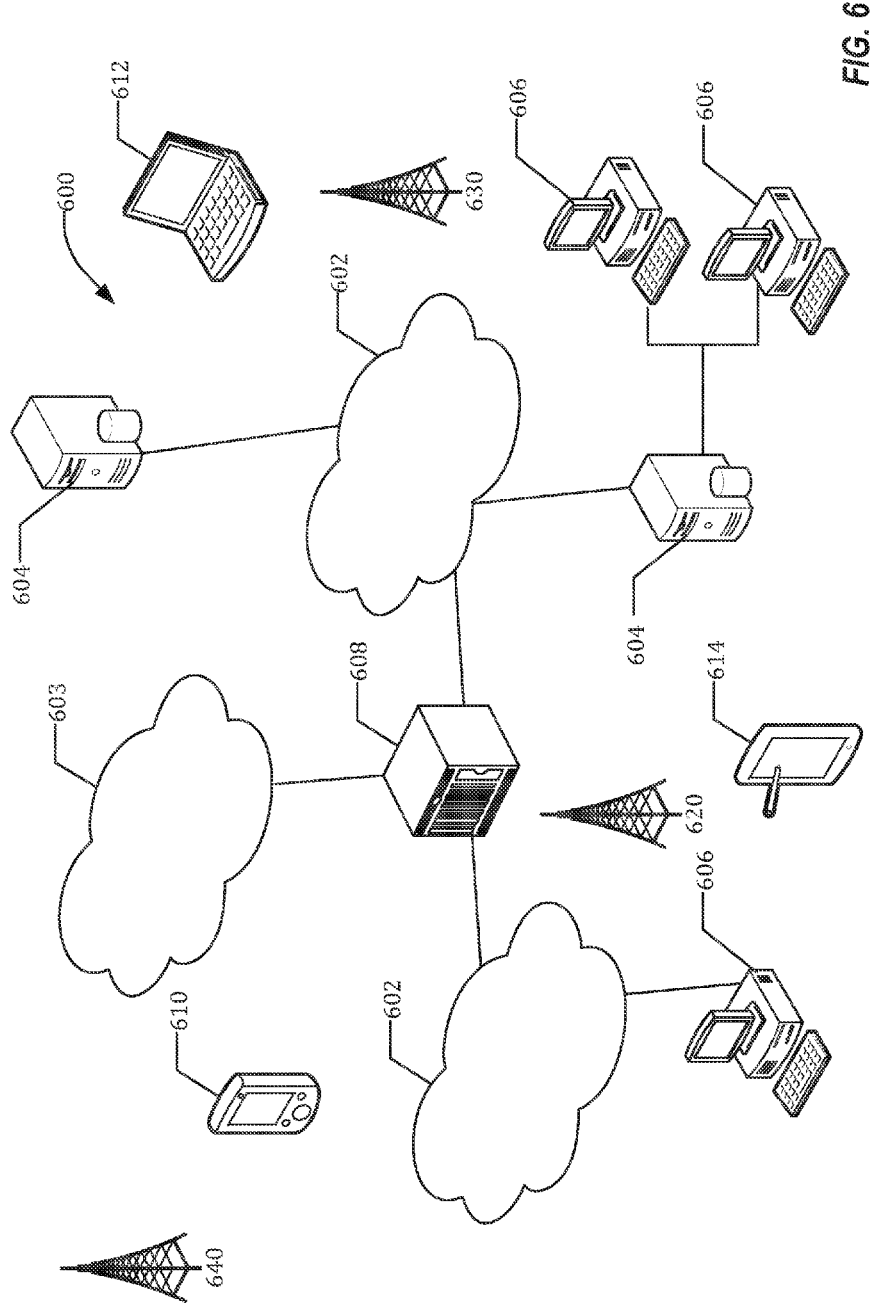
FIG. 6 is a diagram illustrating a network of programmable devices according to one embodiment.

Referring now to FIG. 6, an example infrastructure 600 in which the techniques described above may be implemented is illustrated schematically. Infrastructure 600 contains computer networks 602. Computer networks 602 may include many different types of computer networks available today, such as the Internet, a corporate network or a Local Area Network (LAN). Each of these networks can contain wired or wireless programmable devices and operate using any number of network protocols (e.g., TCP/IP). Networks 602 may be connected to gateways and routers (represented by 608), end user computers 606, and computer servers 604. Infrastructure 600 also includes cellular network 603 for use with mobile communication devices. Mobile cellular networks support mobile phones and many other types of mobile devices. Mobile devices in the infrastructure 600 are illustrated as mobile phones 610, laptops 612 and tablets 614. A mobile device such as mobile phone 610 may interact with one or more mobile provider networks as the mobile device moves, typically interacting with a plurality of mobile network towers 620, 630, and 640 for connecting to the cellular network 603. Although referred to as a cellular network in FIG. 6, a mobile device may interact with towers of more than one provider network, as well as with multiple non-cellular devices such as wireless access points and routers 608. In addition, the mobile devices 610, 612 and 614 may interact with non-mobile devices such as computers 604 and 606 for desired services, which may include determining web forms and field information in web pages that is provided to client 108 described above.

The following examples pertain to further embodiments.

Example 1 is a machine readable medium, on which are stored instructions, comprising instructions that when executed cause a machine to: receive a web page for a web site over a network by an analysis server; discover field and form information for the web page; validate the field and form information using a crowd-sourcing service; accept the field and form information as validated field and form information responsive to a positive result from the crowd-sourcing service; receive a corrected field and form information from a human reviewer responsive to a negative result from the crowd-sourcing service; and send the validated or corrected field and form information from the analysis server to a credential manager application.

In Example 2 the subject matter of Example 1 optionally includes wherein the instructions further comprise instructions that when executed cause the machine to instruct the credential manager application to invalidate some or all of a cache maintained by the credential manager application.

In Example 3 the subject matter of Example 1 optionally includes wherein the instructions further comprise instructions that when executed cause the machine to send the field and form information to a human arbiter responsive to a mixed result from the crowd-sourcing service.

In Example 4 the subject matter of Examples 1-3 optionally includes wherein the instructions to validate the field and form information using a crowd-sourcing service comprise instructions that when executed cause the machine to: generate a screenshot of the web page; mark the fields on the screenshot; and send the screenshot to the crowd-sourcing service for validation.

In Example 5 the subject matter of Examples 1-3 optionally includes wherein the instructions to validate the field and form information using a crowd-sourcing service comprise instructions that when executed cause the machine to: request at least three crowd-sources responses from the crowd-sourcing service; and consider the at least three crowd-source responses as a voting result.

In Example 6 the subject matter of Examples 1-3 optionally includes wherein the instructions further comprise instructions that when executed cause the machine to: use computer vision to view a screenshot of the web page annotated corresponding to the field and form information; and return a decision based on computer vision that indicates a confidence level that the field and form information is correct.

In Example 7 the subject matter of Example 6 optionally includes wherein the instructions further comprise instructions that when executed cause the machine to: pass the screenshot to a human reviewer responsive to the confidence level being lower than a predetermined threshold.

In Example 8 the subject matter of Examples 1-3 optionally includes wherein the instructions that when executed cause the machine to receive the web page comprise instructions that when executed cause the machine to: employ a web crawler for examining web pages.

In Example 9 the subject matter of Example 8 optionally includes wherein the web crawler is configured to crawl a predetermined set of popular web pages.

Example 10 is a computer system for determining web form information in a web page for a web site comprising: one or more processors; and a memory coupled to the one or more processors, on which are stored instructions, comprising instructions that when executed cause at least some of the one or more of the processors to: receive a web page for a web site over a network by an analysis server; discover field and form information for the web page; validate the field and form information using a crowd-sourcing service; accept the field and form information as validated field and form information responsive to a positive result from the crowd-sourcing service; receive a corrected field and form information from a human reviewer responsive to a negative result from the crowd-sourcing service; and send the validated or corrected field and form information from the analysis server to a credential manager application.

In Example 11 the subject matter of Example 10 optionally includes wherein the instructions further comprise instructions that when executed cause at least some of the one or more processors to instruct the credential manager application to invalidate some or all of a cache maintained by the credential manager application.

In Example 12 the subject matter of Example 10 optionally includes wherein the instructions further comprise instructions that when executed cause at least some of the one or more processors to send the field and form information to a human arbiter responsive to a mixed result from the crowd-sourcing service.

In Example 13 the subject matter of Examples 10-12 optionally includes wherein the instructions to validate the field and form information using a crowd-sourcing service comprise instructions that when executed cause at least some of the one or more processors to: generate a screenshot of the web page; mark the fields on the screenshot; and send the screenshot to the crowd-sourcing service for validation.

In Example 14 the subject matter of Examples 10-12 optionally includes wherein the instructions to validate the field and form information using a crowd-sourcing service comprise instructions that when executed cause at least some of the one or more processors to: request at least three crowd-sources responses from the crowd-sourcing service; and consider the at least three crowd-source responses as a voting result.

In Example 15 the subject matter of Examples 10-12 optionally includes wherein the instructions further comprise instructions that when executed cause at least some of the one or more processors to: use computer vision to view a screenshot of the web page annotated corresponding to the field and form information; and return a decision based on computer vision that indicates a confidence level that the field and form information is correct.

In Example 16 the subject matter of Example 15 optionally includes wherein the instructions further comprise instructions that when executed cause at least some of the one or more processors to: pass the screenshot to a human reviewer responsive to the confidence level being lower than a predetermined threshold.

In Example 17 the subject matter of Examples 10-12 optionally includes wherein the instructions that when executed cause at least some of the one or more processors to receive the web page comprise instructions that when executed cause at least some of the one or more processors to: employ a web crawler for examining web pages.

In Example 18 the subject matter of Example 17 optionally includes wherein the web crawler is configured to crawl a predetermined set of popular web pages.

Example 19 is a method for determining web form information in a web page for a web site, comprising: receiving a web page for a web site over a network by an analysis server; discovering field and form information for the web page; validating the field and form information using a crowd-sourcing service; accepting the field and form information as validated field and form information responsive to a positive result from the crowd-sourcing service; receiving a corrected field and form information from a human reviewer responsive to a negative result from the crowd-sourcing service; and sending the validated or corrected field and form information from the analysis server to a credential manager application.

In Example 20 the subject matter of Example 19 optionally includes further comprising instructing the credential manager application to invalidate some or all of a cache maintained by the credential manager application.

In Example 21 the subject matter of Example 19 optionally includes further comprising sending the field and form information to a human arbiter responsive to a mixed result from the crowd-sourcing service.

In Example 22 the subject matter of Examples 19-21 optionally includes wherein validating the field and form information using a crowd-sourcing service comprises: generating a screenshot of the web page; marking the fields on the screenshot; and sending the screenshot to the crowd-sourcing service for validation.

In Example 23 the subject matter of Examples 19-21 optionally includes wherein validating the field and form information using a crowd-sourcing service comprises: requesting at least three crowd-sources responses from the crowd-sourcing service; and considering the at least three crowd-source responses as a voting result.

In Example 24 the subject matter of Examples 19-21 optionally includes further comprising: using computer vision to view a screenshot of the web page annotated corresponding to the field and form information; and return a decision based on computer vision that indicates a confidence level that the field and form information is correct.

In Example 25 the subject matter of Examples 19-21 optionally includes wherein receiving the web page comprise: employing a web crawler for examining web pages.

Example 26 is a computer system, comprising: means for receiving a web page for a web site over a network by an analysis server; means for discovering field and form information for the web page; means for validating the field and form information using a crowd-sourcing service; means for accepting the field and form information as validated field and form information responsive to a positive result from the crowd-sourcing service; means for receiving a corrected field and form information from a human reviewer responsive to a negative result from the crowd-sourcing service; and means for sending the validated or corrected field and form information from the analysis server to a credential manager application.

In Example 27 the subject matter of Example 26 optionally includes further means for instructing the credential manager application to invalidate some or all of a cache maintained by the credential manager application.

In Example 28 the subject matter of Example 26 optionally includes further comprising sending the field and form information to a human arbiter responsive to a mixed result from the crowd-sourcing service.

In Example 29 the subject matter of Examples 26-28 optionally includes wherein the means for validating the field and form information using a crowd-sourcing service comprise: means for generating a screenshot of the web page; means for marking the fields on the screenshot; and means for sending the screenshot to the crowd-sourcing service for validation.

In Example 30 the subject matter of Examples 26-28 optionally includes wherein the means for validating the field and form information using a crowd-sourcing service comprise: means for requesting at least three crowd-sources responses from the crowd-sourcing service; and means for considering the at least three crowd-source responses as a voting result.

In Example 31 the subject matter of Examples 26-28 optionally includes further comprising: means for using computer vision to view a screenshot of the web page annotated corresponding to the field and form information; and means for returning a decision based on computer vision that indicates a confidence level that the field and form information is correct.

In Example 32 the subject matter of Example 31 optionally includes further comprising: means for passing the screenshot to a human reviewer responsive to the confidence level being lower than a predetermined threshold.

In Example 33 the subject matter of Examples 26-28 optionally includes wherein the means for receiving the web page comprise: means for employing a web crawler for examining web pages.

In Example 34 the subject matter of Example 33 optionally includes wherein the web crawler is configured to crawl a predetermined set of popular web pages.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage device comprising instructions that, when executed by a machine, cause the machine to at least:
   discover field and form information for a web page of a web site, the web page accessed over a network by an analysis server;
   create an annotated image of the web page to mark a position for a field of the field and form information, the annotated image created without displaying the web page to a user, the annotated image including the field and form information;
   transmit the annotated image with the field and form information to a crowd-sourcing service;
   accept the field and form information as validated field and form information responsive to a positive result from the crowd-sourcing service, the positive result indicating that the marked position of the field is correct;
   receive corrected field and form information from a human reviewer responsive to a negative result from the crowd-sourcing service, the negative result indicating that the marked position of the field is incorrect;
   send the annotated image with the field and form information to a human arbiter responsive to a mixed result from the crowd-sourcing service, and receive either corrected field and form information from the human arbiter responsive to a negative decision from the human arbiter or validated field and form information responsive to a positive decision from the human arbiter, the mixed result indicating that a minority of votes received by the crowd-sourcing service identify the marked position of the field as incorrect;
   send the at least one of validated or corrected field and form information from the analysis server to a credential manager application;
   instruct the credential manager application to cache the at least one of the validated or corrected field and form information, and the marked position of the field, in a cache memory; and
   instruct the credential manager application to insert credentials into a web page based on the at least one of the validated or corrected field and form information stored in the cache memory.

2. The storage device of claim 1, wherein the instructions, when executed, cause the machine to instruct the credential manager application to invalidate some or all of the cached field and form information maintained by the credential manager application.

3. The storage device of claim 1, wherein the instructions, when executed, cause the machine to:
   request at least three crowd-source responses from the crowd-sourcing service; and
   consider the at least three crowd-source responses as a voting result.

4. The storage device of claim 1, wherein the instructions, when executed, cause the machine to:
   use computer vision to view the annotated image of the web page annotated corresponding to the field and form information; and
   return a decision based on the computer vision that indicates a confidence level that the field and form information is correct.

5. The storage device of claim 4, wherein the instructions, when executed, cause the machine to pass the annotated image to the human reviewer responsive to the confidence level being lower than a threshold.

6. The storage device of claim 1, wherein the instructions, when executed, cause the machine to employ a web crawler to examine web pages.

7. The storage device of claim 6, wherein the web crawler is to crawl a set of web pages.

8. A computer system for determining web form information in a web page for a web site, the computer system comprising:
   one or more processors; and
   memory to store instructions that, when executed by the one or more processors, cause at least one of the one or more of the processors to at least:
   discover field and form information for a web page of a web site, the web page accessed over a network by an analysis server;
   create an annotated image of the web page to mark a position for a field of the field and form information, the annotated image created without displaying the web page to a user, the annotated image including the field and form information;
   transmit the annotated image including the field and form information to a crowd-sourcing service;
   accept the field and form information as validated field and form information responsive to a positive result from the crowd-sourcing service, the positive result indicating that the marked position of the field is correct;
   receive corrected field and form information from a human reviewer responsive to a negative result from the crowd-sourcing service, the negative result indicating that the marked position of the field is incorrect;
   send the annotated image with field and form information to a human arbiter responsive to a mixed result from the crowd-sourcing service, and receive either corrected field and form information from the human arbiter responsive to a negative decision from the human arbiter or validated field and form information responsive to a positive decision from the human arbiter, the mixed result indicating that a minority of votes received by the crowd-sourcing service identify the marked position of the field as incorrect;
   send the at least one of the validated or corrected field and form information from the analysis server to a credential manager application;
   instruct the credential manager application to cache the at least one of the validated or corrected field and form information, and the marked position of the field, in a cache memory; and
   instruct the credential manager application to insert credentials into a web page based on the at least one of the validated or corrected field and form information stored in the cache memory.

9. The computer system of claim 8, wherein the at least one of the one or more processors is to instruct the credential manager application to invalidate at least a portion of the cached field and form information maintained by the credential manager application.

10. The computer system of claim 8, wherein at least one of the one or more processors is to at least:
    request at least three crowd-source responses from the crowd-sourcing service; and
    consider the at least three crowd-source responses as a voting result.

11. The computer system of claim 8, wherein at least one of the one or more processors is to at least:

use computer vision to view the annotated image of the web page annotated corresponding to the field and form information; and return a decision based on the computer vision that indicates a confidence level that the field and form information is correct.

12. The computer system of claim 11, wherein at least one of the one or more processors is to pass the annotated image to the human reviewer responsive to the confidence level being lower than a threshold.

13. The computer system of claim 8, wherein at least one of the one or more processors is to receive the web page by employing a web crawler to examine web pages.

14. The computer system of claim 13, wherein the web crawler is to crawl a set of web pages.

15. A method for determining web form information in a web page for a web site, the method comprising:

discovering field and form information for a web page of a web site, the web page accessed over a network by an analysis server;

creating an annotated image of the web page to mark a position for a field of the field and form information, the annotated image created without displaying the web page to a user, the annotated image including the field and form information;

transmitting the annotated image with the field and form information to a crowd-sourcing service;

accepting the field and form information as validated field and form information responsive to a positive result from the crowd-sourcing service, the positive result indicating that the marked position of the field is correct;

receiving corrected field and form information from a human reviewer responsive to a negative result from the crowd-sourcing service, the negative result indicating that the marked position of the field is incorrect;

sending the annotated image with the field and form information to a human arbiter responsive to a mixed result from the crowd-sourcing service, and receive either corrected field and form information from the human arbiter responsive to a negative decision from the human arbiter or validated field and form information responsive to a positive decision from the human arbiter, the mixed result indicating that a minority of votes received by the crowd-sourcing service identify the marked position of the field as incorrect;

sending the at least one of the validated or corrected field and form information from the analysis server to a credential manager application;

instructing the credential manager application to cache the at least one of the validated or corrected field and form information, and the position of the field, in a cache memory; and instructing the credential manager application to insert credentials into a web page based on the at least one of the validated or corrected field and form information stored in the cache memory.

16. The method of claim 15, further including instructing the credential manager application to invalidate at least a portion of the cached field and form information maintained by the credential manager application.

17. The method of claim 15, wherein the validating of the field and form information using crowd-sourcing service includes:

requesting at least three crowd-source responses from the crowd-sourcing service; and considering the at least three crowd-source responses as a voting result.

18. The method of claim 15, further including:

using computer vision to view the annotated image of the web page annotated corresponding to the field and form information; and return a decision based on the computer vision that indicates a confidence level that the field and form information is correct.

19. The method of claim 15, wherein the receiving of the web page includes employing a web crawler to examine web pages.

* * * * *